M. J. PAYNE.
VALVE FOR CONTAINERS.
APPLICATION FILED MAR. 24, 1916.

1,247,713.

Patented Nov. 27, 1917.

Witnesses

Marshall J. Payne
Inventor

UNITED STATES PATENT OFFICE.

MARSHALL J. PAYNE, OF STAUNTON, VIRGINIA.

VALVE FOR CONTAINERS.

1,247,713.

Specification of Letters Patent.

Patented Nov. 27, 1917.

Application filed March 24, 1916. Serial No. 86,346.

*To all whom it may concern:*

Be it known that I, MARSHALL J. PAYNE, a citizen of the United States, and resident of Staunton, in the county of Augusta and in the State of Virginia, have invented a certain new and useful Improvement in Valves for Containers, and do hereby declare that the following is a full, clear, and exact description thereof.

My invention relates to valves, such as those used for containers for liquids, gases and air in which the internal pressure on the valve is utilized to hold it to its seat, and the object of my invention is to provide a valve of this description which may be positively held upon its seat regardless of the effect of the internal pressure. The device is exceedingly simple, its parts will be few, and its operation may be performed without any special skill or knowledge on the part of the operator, and it is, therefore, well adapted to the purpose for which it is intended.

Figure 1:
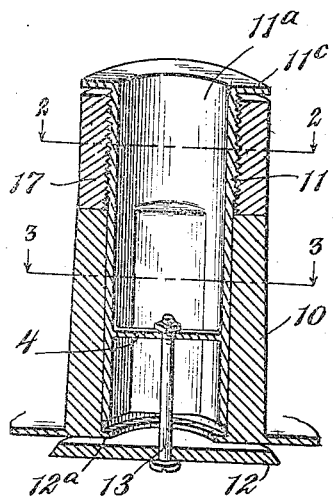
Figure 1 is a vertical section of the valve embodying one form of my invention.
Figure 2:
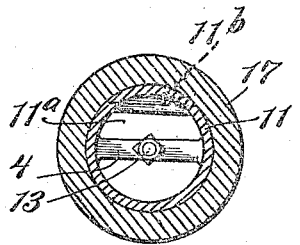
Fig. 2 is a horizontal section on the line 2—2 of Fig. 1.
Figure 3:
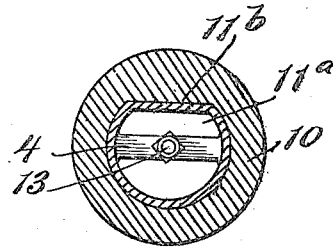
Fig. 3 is a horizontal section on the line 3—3 of Fig. 1.

In Fig. 1, the valve casing 10 shown is of any suitable material constructed so that the casing 10 extends from within the container outward, and having a valve seat 12$^a$ integral with the casing 10. This casing is made preferably of metal, and may be made to assume any convenient form desired, and likewise the valve 12 having a stem 13, and the valve seat 12$^a$ may be made of any suitable material, and of any suitable form desired adapted to coöperate with the contacting parts.

The concentric tubular sleeve 11 is shown having its outer end 11$^a$ externally screw threaded, and adapted to engage the internally screw threaded sleeve 17. The tubular sleeve 11 is provided with the flange 11$^c$ in order that the sleeve 17 may be prevented from accidental displacement, and the said flange 11$^c$ may be utilized to connect the device to any suitable conduit. The flange 11$^c$ serves also to limit the outward travel of the sleeve 17, and likewise the outer end of the casing 10 acts, in a similar way, to limit the travel of the sleeve 17 in the opposite direction.

The said concentric tubular sleeve 11 is suitably positioned or placed in the valve casing 10, and while it is movable axially, or longitudinally, is prevented from rotating or turning by the flattened portion 11$^b$ of the lower end of the sleeve 11 having conforming thereto the contiguous surface of the bore or axial opening of the casing 10. Thus when the sleeve 17 is screwed to the right or to the left and impinges on either the flange 11$^c$ or the outer end of the casing 10, as the case may be, the sleeve 11 will correspondingly be moved, since it is incapable of rotation and can only move axially.

I utilize the movement of the sleeve 11 to positively move the valve 12 and also to hold it positively to its seat 12$^a$ by providing suitable co-acting surfaces 4 upon the sleeve 11 and the valve stem 13.

The action of the device is as follows: By unscrewing the sleeve 17 toward the flange 11$^c$, inward movement of the sleeve and valve may obviously take place, so that the valve is put in position and allowing the container to be filled or emptied. The valve may be positively forced against its seat by screwing the sleeve 17 in a right hand or clock-wise direction, thereby preventing leakage.

The device is exceedingly simple, yet serves its purpose perfectly. However, it is to be understood that the construction shown in the drawings and described in the specifications, is merely an illustration of one form and adaptation of my invention, the scope whereof extends to and may receive forms of diverse mechanical expressions.

Having thus described my invention, I claim:

1. A valve comprising a valve casing having an internal valve seat, a valve to coöperate with the seat having a valve stem operably connected to a tubular sleeve positioned in the valve casing and adapted for axial and not rotary movement, an outwardly threaded extension mounted on the tubular member in operative engagement with a screw sleeve adapted to bear on the valve casing, a stop on the threaded extension acting to limit outward movement of the screw sleeve and likewise to limit inward movement of the tubular member, with means whereby movement of the sleeve acts to impart axial motion to the tubular member and to hold the valve to its seat.

2. A valve comprising a valve casing having an internal valve seat, a valve to coöperate with the seat having a stem operably connected to a tubular member positioned in the casing and adapted for axial and not rotary movement, said tubular member provided with an outwardly threaded extension in operative engagement with a screw sleeve adapted to bear on the valve casing and acting to move the tubular member in an axial direction, means for limiting movement of the screw sleeve and the tubular member, said means embracing a stop on the said tubular member, with means whereby the valve is positively held to its seat.

3. A valve comprising a valve casing having an internal valve seat, a valve to coöperate with the seat having a stem operably connected to a tubular member positioned in the casing for axial and not rotary movement, an outwardly threaded extension mounted on the tubular member, a stop on the extension, a threaded sleeve adapted to bear on the valve casing and the stop on the extension engaging the threads on the extension, means acting to move the tubular member a predetermined axial distance with means for positively holding the valve to its seat.

4. A valve comprising a valve casing having an internal valve seat, a valve to coöperate with the seat having a valve stem operably connected to a tubular member positioned in the casing for axial and not rotary movement, said tubular member provided with a threaded extension in operative relation with a threaded sleeve bearing on the valve casing, a stop on the threaded extension of the tubular member acting to hold the tubular member and threaded sleeve in operative relation, with means acting to move and hold the valve to its seat.

5. A valve comprising a valve casing having an internal valve seat, a valve to coöperate with the seat having a valve stem operably connected to a tubular member positioned in the casing for axial and not rotary movement, a threaded extension of the tubular member in operative engagement with a threaded sleeve adapted to bear on the valve casing, and acting to impart axial movement to the tubular member and the valve, means for limiting the movement of the threaded sleeve and the tubular member, with means acting to move the valve in an axial direction and hold the valve to its seat.

MARSHALL J. PAYNE.

Witnesses:
F. G. McFerrin,
P. M. Payne.

Copies of this patent may be obtained for five cents each, by addressing the "Commissioner of Patents, Washington, D. C."